United States Patent [19]
Kanai et al.

[11] Patent Number: 5,638,508
[45] Date of Patent: Jun. 10, 1997

[54] METHOD AND A SYSTEM FOR PROCESSING A LOG RECORD

[75] Inventors: Sadasaburoh Kanai, Yokohama; Toshiaki Tsuboi, Kawasaki; Hiroyuki Kitajima; Takashi Sumiyoshi, both of Yokohama, all of Japan

[73] Assignees: Hitachi, Ltd.; Hitachi Micro Computer Engineering, Ltd., both of Tokyo, Japan

[21] Appl. No.: 208,044

[22] Filed: Mar. 9, 1994

Related U.S. Application Data

[63] Continuation of Ser. No. 684,145, Apr. 11, 1991, abandoned, which is a continuation of Ser. No. 219,264, Jul. 15, 1988, abandoned.

[30] Foreign Application Priority Data

Jul. 17, 1987 [JP] Japan ................................. 62-178229

[51] Int. Cl.$^6$ ................................................ G06F 12/16
[52] U.S. Cl. .................. 395/182.18; 395/440; 395/446
[58] Field of Search ................................. 395/425, 600, 395/575, 182.18, 182.13, 440, 446, 456, 460, 462, 486

[56] References Cited

U.S. PATENT DOCUMENTS

| | | | |
|---|---|---|---|
| 4,507,751 | 3/1985 | Gawlick et al. | 364/900 |
| 4,521,847 | 6/1985 | Ziehm et al. | 371/16.5 |
| 4,648,031 | 3/1987 | Jenner | 364/200 |
| 4,868,744 | 9/1989 | Reinsch et al. | 364/200 |
| 4,875,155 | 10/1989 | Iskiyan et al. | 395/425 |
| 4,878,167 | 10/1989 | Kapulka et al. | 364/200 |
| 5,043,871 | 8/1991 | Nishigaki et al. | 395/600 |

FOREIGN PATENT DOCUMENTS

| | | | |
|---|---|---|---|
| 0062144 | 3/1986 | Japan | G06F 11/34 |
| 0070645 | 4/1986 | Japan | G06F 11/34 |
| 0014242 | 1/1987 | Japan | G06F 11/34 |

OTHER PUBLICATIONS

Fernandez, E, et al., *Database Security and Integrity*, 1981, Addison–Wesley Publishing Co, pp. 134–133.

Date, C.J, *An Introduction to Database Systems*, 1983, Addison–Wesley Publishing Co, pp. 1–24.

*Primary Examiner*—Eddie P. Chan
*Assistant Examiner*—Kevin L. Ellis
*Attorney, Agent, or Firm*—Antonelli, Terry, Stout & Kraus, LLP

[57] ABSTRACT

A data processing system for processing transactions, wherein a log record to be used for recovery of the system is written into a log file for system recovery in synchronism with the end of a transaction, and log records other than resident information are is written for a plurality of transactions into a log file for archives.

9 Claims, 3 Drawing Sheets

1

METHOD AND A SYSTEM FOR PROCESSING A LOG RECORD

This application is a continuation of application Ser. No. 07/684,145, filed on Apr. 11, 1991 which is a continuation of application Ser. No. 07/219,264, filed on Jul. 15, 1988 both now abandoned.

BACKGROUND OF THE INVENTION

1. Field of the Invention

The present invention relates to a method of processing a log record and, more particularly, to a method of logging a record, which is suitable for a high-traffic on-line data processing system for transaction processing.

2. Description of the Prior Art

In a data processing system for transaction processing in an on-line system according to the prior art, it is necessary to hold the logical consistency of the system even in case of failure such as power interruption or system down. During the system run, therefore, there are logged the records concerning the update of various data by the transactions, the input/output of a message, etc. The log records have to be sequentially logged because their time sequential order of logging is important for their object. As a result, the way of logging log records largely affects the performance of a high-traffic on-line system. As a solution for this problem, there is a method for dispersing the load by logging the records in a plurality of external storages in the order of generation by the round robin method, as disclosed in Japanese Patent Laid-Open No. 60-3036.

This example of the prior art can improve the logging ability in proportion to the number of storages but has a problem that the number of storages becomes excessively large when the traffic increase. Since, moreover, all the log records are written altogether like the method of the prior art, each of the log records is stored more than necessary to raise another problem that the amount of storage of the log records becomes massive.

SUMMARY OF THE INVENTION

An object of the present invention is to provide a processing method of logging record, which solves the above-specified problems of the prior art and improves the logging ability without increasing the number of storages while reducing the amount of storage of the log records.

In order to solve those problems, the logging method of the present invention is characterized in that various log records of a data processing system for transaction processing are divided into two, namely records for recovery from failures and other records. The log records for the recovery are logged more frequently than the other records.

For example, the log records for the recovery processing of the system are written in synchronism with the end of the transaction, and the other log records are written altogether for a plurality of transactions.

DETAILED DESCRIPTION OF THE PREFERRED EMBODIMENTS

First of all, the summary of the present invention will be described in the following.

The log records required for the system recovery processing include the update log records of database and the resident tables on a main storage/virtual storage, the log records concerning input/output messages, and the log records indicating the end of a transaction and so on. These log records are used to recover the transactions and the system into a logically consistent status when the system is stopped by a failure. This makes it necessary to make a logging in a non-volatile storage in synchronism with the end of the transaction. Taking this into consideration, in the present invention, the log records are stored in a high-speed device such as a semiconductor storage, which is made non-volatile by means of a battery, so that frequent input/output operations can be performed at a high traffic rate. The semiconductor storage is usually expensive and does not have a large capacity. However, the log records for the system recovery processing do not require a long period of preservation so that the necessary log records can be written by repeative use of such a device.

On the other hand, the log records to be written for purposes other than the system recovery includes the log records for data base recovery, the log records for recording the business processing, and the log records to be used in a user program for the business processing. These log records need not necessarily be written in synchronism with the end of a transaction, but they need a considerably longer period of preservation than that of the log records for system recovery. In the present invention, therefore, these log records are stored on a disk or magnetic tape which is slower but more inexpensive than the semiconductor storage. In addition, the time period for the mechanical actions, which usually occupies a large portion in the input/output processing of the disk, is minimized by writing the log records altogether for a plurality of transactions, and only the necessary records are written to save storage, whereby improving the logging capability. Incidentally, the disk is advantageous in its large capacity, and the magnetic tape is advantageous in its facility of medium exchange.

The log records to be used in the system recovery processing require a short period of preservation (usually about 1,000 to 10,000 transactions). On the other hand, the log records to be acquired for the purposes other than the system recovery require a long period of preservation but have a less amount of logging than that of the prior art because of the use of necessary records only. As a result, the total amount of the log records is reduced.

The present invention will be described in detail in the following in connection with the embodiment thereof with reference to the accompanying drawings.

Figure 2:
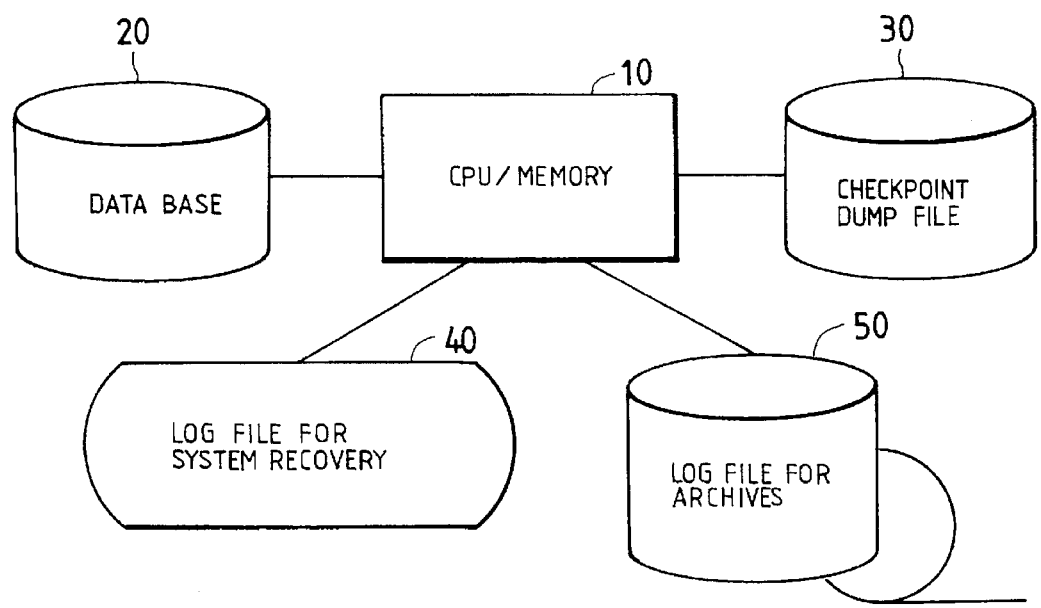
FIG. 2 is a block diagram showing the overall construction of a data processing system to which is applied the present invention.

FIG. 2 is a diagram showing the overall construction of one embodiment of a data processing system to which is applied the present invention.

In the present data processing system, there are connected with a CPU/memory (i.e., main storage/virtual storage) 10: a data base 20 stored in a magnetic disk or the like; a check point dump file (which will be shortly referred to as "CD file") 30; a log file for system recovery 40; and a log file for archives 50. The CD file 30 is used for periodically writing records from the main storage/virtual storage, which is to be recovered when the system is stopped by failure, against the possible failure while the system is running. The written record will be called the "check point dump record" (which will also be shortly referred to as the "CD information"). The recording medium is exemplified by a non-volatile storage device, usually DASD (i.e., direct access storage device) such as a magnetic disk. The CD information is usually written each time a predetermined number of log records for system recovery are written. The log file for system recovery 40 is a file having the log records necessary for recovering the system which is stopped by a failure. The log records necessary for the system recovery include an update log record of the database, an update log record of the resident table on main storage/virtual storage, a log record concerning input/output messages, and a log record indicating the completion/cancel of a transaction. A medium for the log file for system recovery 40 is a semiconductor disk which is prepared by making a semiconductor storage non-volatile with a battery. The log record necessary for the system recovery is basically a record logged after the writting of final effective CD information is started. If a sufficient file capacity (several times as large as the minimum necessity) for storing the log records within those ranges is retained, the log file for system recovery 40 can be repeatedly used by erasing the old record by the wrap-around method. The log file for archives 50 contains the log record for data base recovery, the log record for recording a business processing contents, and a log record to be used in a user program for a variety of business processings. The medium of archive log file to be used is the DASD such as a magnetic disk and a magnetic tape. The archive log record requires a long period of preservation and has to be finally copied and stored in a magnetic tape even in case it is stored in the DASD.

Figure 1:
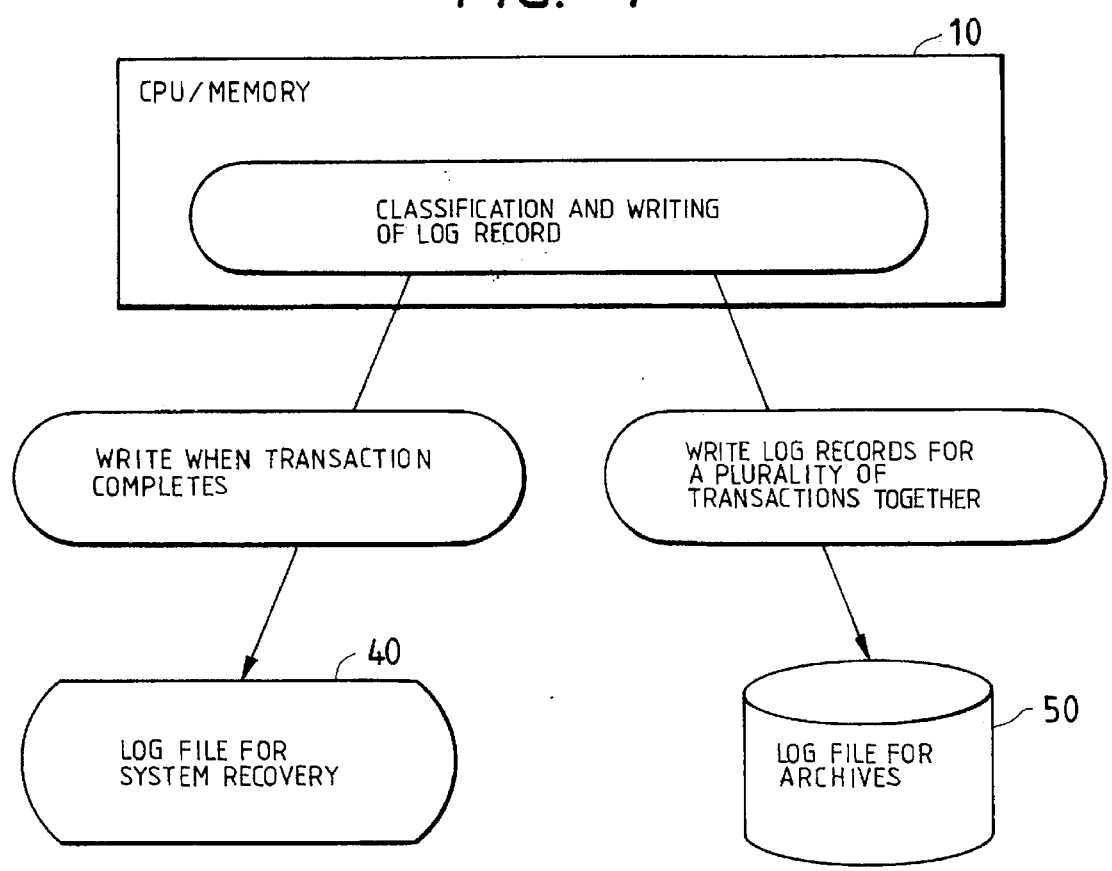
FIG. 1 is a block diagram showing the summary of one embodiment of the present invention.

FIG. 1 is a diagram for explaining the operations of the data processing system according to one embodiment of the present invention. The operations of the present embodiment will be described in brief with reference to FIG. 1. In the present embodiment, a variety of log records accompanying the transaction processing during the system run are classified and .written in accordance with the objects of the log records. Specifically, the classifications are the log records for system recovery used in the system recovery, and the log records for archives used for data base recovery, for recording of business processing contents and for use in various batch application programs. The former records are stored in the log file for system recovery 40 upon completion of each transaction, and the latter records are stored altogehter for several transactions in the log file for archives 50. Incidentally, the log records for system recovery and the log records for archives need not be exclusive but may be partially common. The system operations to be described in the following are divided into the operation at the normal processing, the operation at the check point and the operation at the system failure.

(1) Operations at the Normal Processing

Figure 3:
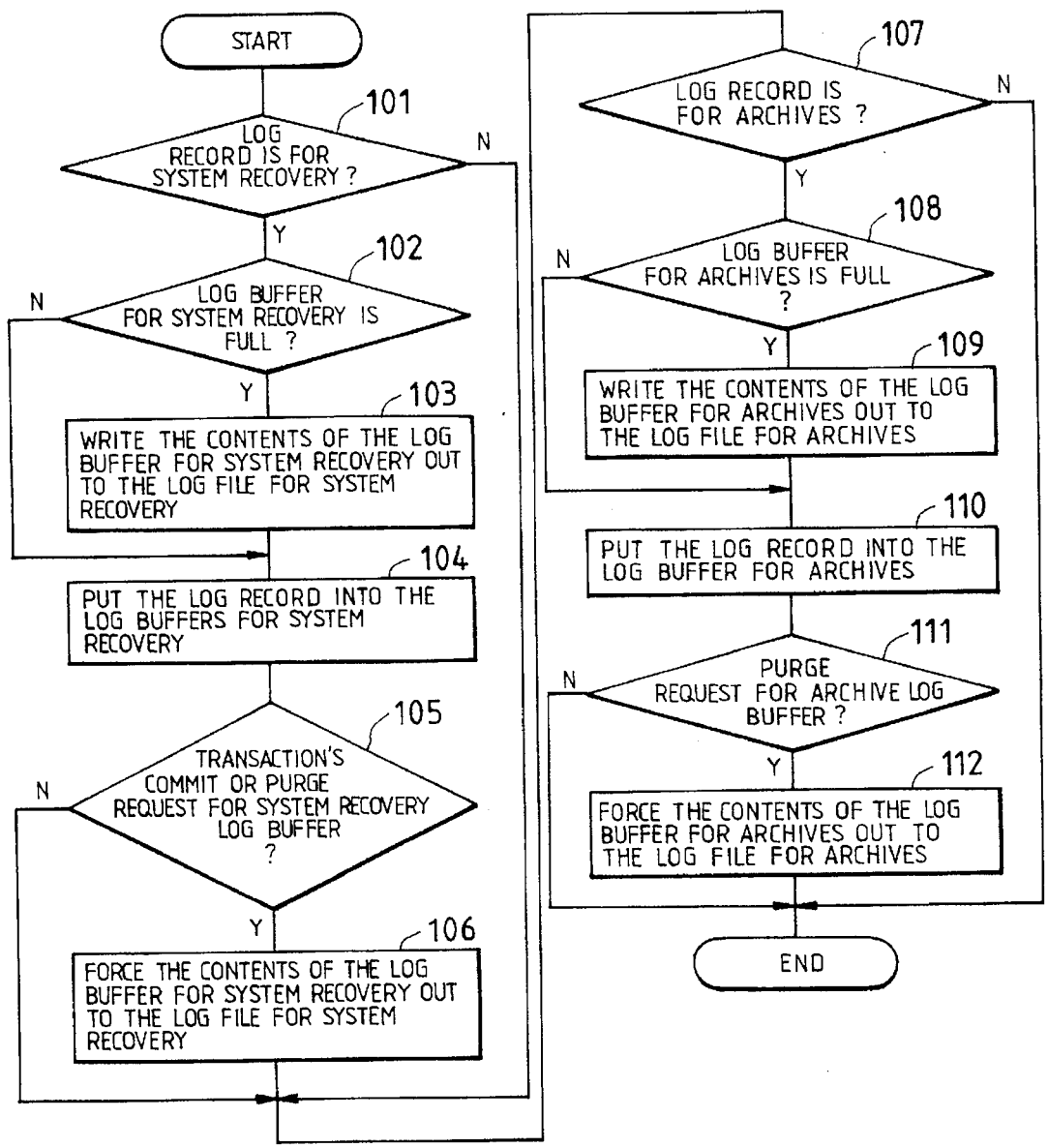
FIG. 3 is a processing flow chart for logging in the embodiment of the present invention.

FIG. 3 is a flow chart showing a partial routine of a normal transaction processing but according to the present invention. This routine shows the processing by the CPU/memory 10. If there arise during the transaction processing events such as an update of the data base, an update of the resident table on a main storage/virtual storage, input and output of a message, or completion of the transaction, the log records are written according to the processing flow shown in FIG. 3. The description will be proceeded in the following with reference to FIG. 3.

(a) Write Log Records for System Recovery (Steps 101 to 106)

In case the log record to be written for the system recovery (as judged at the step 101), the processing is as follows:

① Judge Whether Buffer is Full (Step 102)

Normally, a log record is not instantly stored in the file but temporarily in a buffer area on a memory for blocking to improve the performance. For the log record for system recovery, the buffer size is assumed to be about two or three times (e.g., 32 KB) as large as the average amount of the log record for system recovery of one transaction. At this step, it is judged whether or not a enough space to write the log record to be processed is in the log buffer for system recovery.

② Write Log Record into Medium (Step 103)

If it has been judged at the step 102 that the log buffer is full, the contents of the buffer are written in the log file for system recovery 40.

③ Put Log Record into Buffer (Step 104)

The log record to be written is put into the log buffers for system recovery.

④ Judge Necessity for Synchronization (Step 105)

In the case of completion of the transaction (including the end of transaction backout) and a request for buffer purge due to the update of the data base, the log record stored in the buffer has to be written in the log file for system recovery 40. At this step, it is judged whether or not the writing is necessary.

⑤ Write Log Record into Medium (Step 106)

In the case of requirement for synchronous writing into medium at step 102, the log record stored in the buffer is written in the log file for system recovery 40.

(b) Write Recording Log Records (Steps 107 to 112)

In case it is judged (at the step 107) that the log record to be written is that for archives, the routine is as follows:

① Judge Whether Buffer is Full (Step 108)

Like the log record for system recovery, it is judged whether or not the log buffer for archives is full. Incidentally, in the case of the log record for archives, the buffer size is at least several to several tens of times (e.g., 128 KB) as large as the written average amount of the log record for archives of one transaction.

② Write Log Record into Medium (Step 109)

In case the buffer is full in the step 108, the log record stored in the buffer is written in the log file for archives 50.

③ Put Log Record in Buffer (Step 110)

The log record for archives is put into the log buffer for archives.

④ Judge Necessity for Buffer Purge (Step 111)

There may be some cause for which the content of the log buffer for archives is to be written in the medium. At this step, this necessity is judged.

⑤ Write Log Record into Medium (Step 112)

In case the purge to the medium is necessary at the foregoing step 111, the log records in the buffer are written into the log file for archives 50.

In the routines (a) and (b), it is determined at the initial setting of the system whether or not the various log records are written into either of the log files for system recovery and/or for archives.

(2) Operation at Check Points

Figure 4:
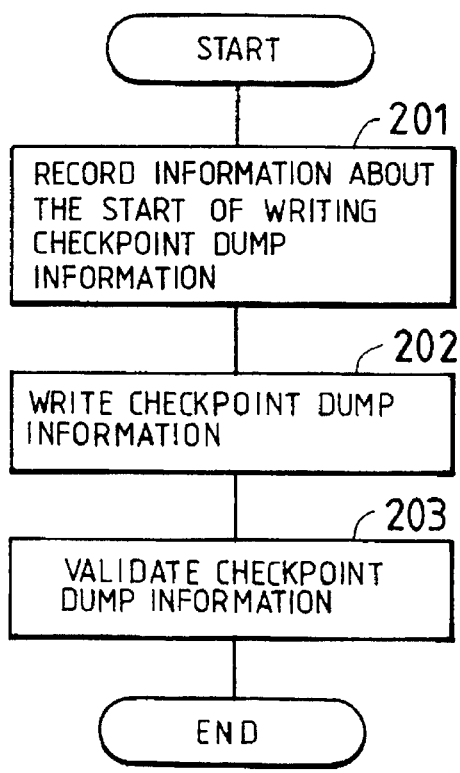
FIG. 4 is a processing flow chart at a check point.

In an on-line system or the like, with a view to shortening the time period for system recovery when the system is stopped by a failure, check points are provided at predetermined intervals during the system run so that the contents of the various data including the resident table on the main storage/virtual storage are written at the check points into a non-volatile storage. In the on-line system, moreover, the various summation data and the counters to be referred to or updated for the on-line processing or the data for administering the various kinds of status of terminals or lines are resident on the main storage/virtual storage so that their copies may be written at the check points in the non-volatile storage such as a disk. In the present embodiment, the data thus written are called the "check point dump information (or shortly the "CD information") and are stored in the CD file 30 on the DASD. When the system failure occurs, the data residing in the main storage/virtual storage is lost, they are recovered by the use of the update log records in the log file for system recovery 40. At this time, the log records before the start of CD information writing are basically unnecessary in the system recovery processing by using the CD information stored in the CD file 30 at the latest check point. The flow chart for processing at the check point is shown in FIG. 4. Incidentally, writing of the CD information is timed at the instant when the system is started, when the restarting processing is completed, when a predetermined number (normally, 1,000 to 10,000, as designated by the defining parameters at the initial system setting) of log records for system recovery are written into the log file for system recovery 40, or when the log file for system recovery 40 is reused from the head because the log records are written to the tail of the log file. Moreover, in order to provide against failures during the process of writing CD information, the CD file 30 is formed with a plurality of areas to store CD information, which are sequentially used. The description will be continued with reference to FIG. 4.

(a) Write a Record About Start of CD Information Writing Processing (Step 201)

The following records (1) are written in the CD information area of the CD file 30.

(1) The record about the position of the first log record for system recovery, which is related to the transaction being executed at the beginning of CD information writing processing.

(b) Write CD Information (Step 202)

The resident information on the main storage/virtual storage are written out as the CD information in the CD information area of the CD file 30.

(c) Validation of CD Information (Step 203)

After the end of the CD information writing processing, the followign two processings are executed to validate the CD information written:

① The content of the log buffer for system recovery is written to the log file for system recovery 40; and ② Both the positional information of the final log record written by the above processing ① in the log file for system recovery 40, and the serial number of the CD information writing processing are written to the area for CD information in the CD file 30. By the present processing, the CD information written is made the latest valid CD information.

Incidentally, the area for CD information may be formed in a plurality of mediums so as to provide against the medium failure of the CD file 30.

(3) Operations at System Failure

Figure 5:
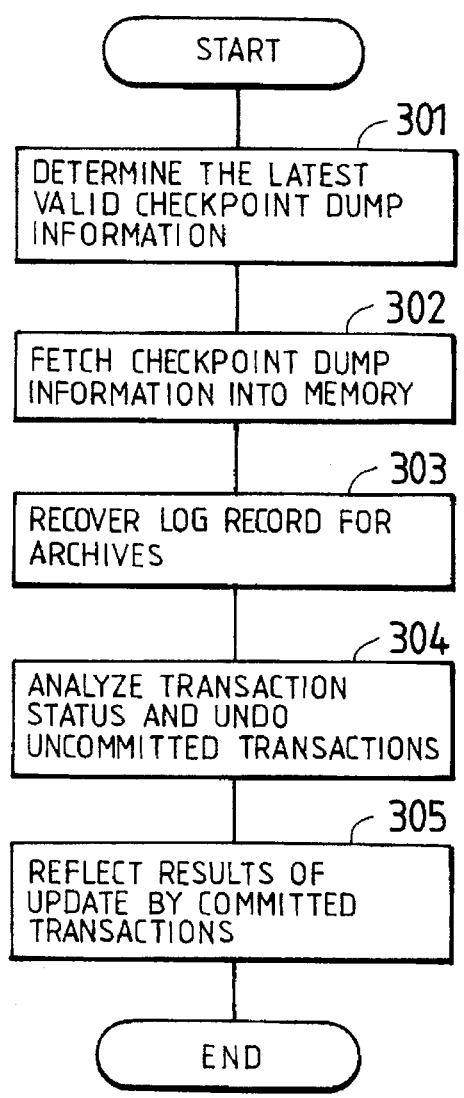
FIG. 5 is a processing flow chart of recovery processing of the system.

When the system is stopped by a failure, it is recovered by using both the log records in the log file for system recovery 40 and the CD information in the CD file 30. Of this system recovery processings, the processing relating to the present invention is schematically shown in FIG. 5. The operations will be described with reference to FIG. 5.

(a) Determine Latest Valid CD Information (Step 301)

The serial number of the CD information writing processing in each CD information area in the CD file 30 is read to determine the latest valid CD information.

(b) Fetch CD Information (Step 302)

The CD information determined at the step 301 is fetched and expanded on the memory.

(c) Recover Log Records for Archives (Step 303)

The log record for archives may partially fail to be written when the system is stopped by failure, because the information of the plurality of transactions is stored in the buffer on the memory. In case the recovery of some kinds of the log records for archives upon failure of logging is designated at the initial setting of the system, this system acquires the designated kinds of log records in the normal operations together with the log record for system recovery in the log record file for system recovery 40. At the present step, moreover, the log record for archives having failed to be written is recovered from the log file for system recovery 40 and written in the log file for archives 50.

(d) Analyze Transaction Status and Undo of Uncommitted Transactions (Step 304)

The log record in the log file for system recovery 40 is read in the reverse direction from the latest written record up to the record at the beginning of the CD information writing processing (accurately the log record indicated by the positional information recorded at the step 301). The processed (complete/incomplete) status of each transaction is analyzed. As to the incomplete transaction and the transaction cancelled midway of the processing, the update data are undone by the use of the log record for system recovery. More specifically, as to the incomplete transaction and the cancelled transaction running in the CD information writing processing the update data may possibly be reflected upon the CD information, and the resident data on the memory are undone. In case, on the other hand, the data base is updated by the incomplete transactions, the update data are undone to the contents before update.

(e) Reflect Update Result of the Complete Transactions (Step 305)

The log record in the log file for system recovery 40 is read in the forward direction from that at the beginning of the CD information writting processing to the latest written information and the results of update of the committed transactions are reflected upon the data base and resident information on the memory.

Thus, in the present embodiment, it is possible to improve the logging ability and to reduce the amount of storage of the log record while suppressing the increase in the number of storages. Incidentally, in the present embodiment, the logging ability can be better improved if the loads are dispersed like the prior art system among a plurality of systems for the log records for system recovery and for archives, respectively. In the present embodiment, moreover, it is possible to expect a drastic speed-up of the system recovery processing if a semiconductor disk or a high-speed device is used as the medium of the log file for system recovery 40. Incidentally, the embodiment thus far described is directed to an example of the recovery from the system failure. Despite of this fact, however, the present invention should not be limited thereto but may be applied to the recovery from the data base medium trouble, for example, in which the log record for recovery from the data base medium failure is written into one file whereas another log record is written into another file.

The effects of specific examples will be estimated in the following:

(a) Prerequisites

(1) Amount of Log Record per Transaction

In the present embodiment, it is assumed that the log record necessary for data base recovery be written into both the log files for system recovery and for archives. As a result, the total amount of these two kinds of log records is more than that of the log records by the system of the prior art. The specific values will be enumerated in the following:

Total amount of the log record of the prior art system: 12 KB; Log record for system recovery: 8 KB; and Log record for archives: 6 KB.

(2) Performance of Semiconductor Disk

Average access time: 0.7 ms; and Data transfer rate: 6 MB/sec.

(3) Performances of Magnetic Disk

Time for rotation: 16.5 ms; Data transfer rate: 3 MB/sec; and Track capacity: capable of storing ten physical records of 4 KB.

(4) Method of logging

Prior art: logging into the magnetic disk by dividing it into a physical record of 4 KB for each transaction; and Invention: The log record for system recovery is divided like the prior art method and written into the semiconductor disk, but the log record for archives is written as a whole for ten transactions into the magnetic disk.

(b) Estimation of Effects

The throughputs of the logging methods according to the prior art and the present invention are determined. Incidentally, the amount of storage of the log record for each transaction is made, as follows, such that the amount of the present invention is reduced to one half of the prior art.

Method of the prior art: The whole log record of 12 KB is stored; and

Method of the invention: Only the log record for archives of 6 KB is stored.

(1) The Throughput of the Prior Art Method per System

The log records of one transaction is outputted for three physical blocks of 4 KB. Since each magnetic disk makes a turn of (1+1/10 of one record), the time period required is: $16.5 \times (1+1/10) \times 3 = 54.45$ ms, i.e., 18 transactions/sec.

(2) The Throughput of the Method of the Present Invention

Log Record for System Recovery

The log records of one transaction is outputted for two physical blocks of 4 KB. Since each transaction requires an access time and a data transfer time of 4 KB, the time period required is: $(0.7+4/6) \times 2 = 2.7$ ms, i.e., 370 transactions/sec.

Log Record for Archives

For the total output of 60 KB of ten transactions, the magnetic disk requires 1 turn and $60/(4 \times 10)$ turns for the data transfer of 60 KB, and the time period required for each transaction is: $16.5 \times (1+1.5)/10 = 4.13$ ms, i.e., 242 transactions/sec.

From the items (1) and (2), the throughput obtainable according to the method of present invention is similar to that of the prior art method, in which the load is dispersed among systems.

As has been described hereinbefore, according to the present invention, the data processing system is enabled to improve the ability of writing the log records and to reduce the amount of storage of the log records without increasing the number of storages.

What is claimed is:

1. A data processing method for storing a plurality of log records of transaction processing in a computer system, comprising the steps of:

classifying said log records into at least a first type of log record and a second type of log record based on uses for said log records, said first type of log record being used for recovery of said computer system, and said second type of log record being used for archival purposes;

storing said first type of log record into a first log buffer upon generation of said first type of log record in a transaction;

storing said second type of log record into a second log buffer upon generation of said second type of log record in said transaction;

storing said first type of log record in said first log buffer to a first storage medium, at least when said transaction ends; and storing said second type of log record in said second log buffer to a second storage medium when said second log buffer is full, wherein size of said second log buffer is a predetermined times as large as an average amount of data for said second type of log record produced in one transaction.

2. A data processing method according to claim 1, wherein said first type of log record includes at least one of log records for updating a data base or a table in a main storage/virtual storage, a log record concerning an input/output message and a log record indicating completion of a transaction.

3. A data processing method according to claim 1, further comprising the steps of:

storing resident data from a main storage/virtual storage at a predetermined check point into a third storage medium of said computer system;

wherein a capacity of said first storage medium of said first type of log record is large enough for storing log records produced within an interval of the checkpoints and said first storage medium for storing said first type of log record is repeatedly used in a wrap-around manner; and recovering said computer system by using said first type of log record from said first storage medium and said resident data from said third storage medium.

4. A data processing system for storing a plurality of log records of transaction processing in a computer system, comprising:

means for classifying said log records into at least a first type of log record and a second type of log record based on uses for said log records, said first type of log record being used for recovery of said computer system, and said second type of log record being used for archival purposes;

means for storing said first type of log record into a first log buffer upon generation of said first type of log record in a transaction;

means for storing said second type of log record into a second log buffer upon generation of said second type of log record in said transaction;

means for storing said first type of log record in said first log buffer to a first storage medium, at least when said transaction ends; and means for storing said second type of log record in said second log buffer to a second storage medium when said second log buffer is full, wherein size of said second log buffer is a predetermined times as large as an average amount of data for said second type of log record produced in one transaction.

5. A data processing system according to claim 4, further comprising:

third means for storing resident data from a main storage/virtual storage medium;

wherein a capacity of said first storage medium of said first type of log record is large enough for storing log records produced within an interval of the checkpoints and said first storage medium is repeatedly used in a wrap-around manner; and fourth means for recovering said computer system by using said first type of log record stored in said first storage medium and said resident data stored in said third storage medium.

6. A data processing method according to claim 1, wherein said first storage medium for storing said first type of log record is a nonvolatile semiconductor storage.

7. A data processing method according to claim 1, wherein said second type of log record further includes at least one of a log record for database recovery, a log record for recording business processing contents and a log record to be used in user programs for business processings.

8. A data processing method according to claim 1, wherein accessing speed of said first storage medium is higher than accessing speed of said second storage medium.

9. A data processing system according to claim 4, wherein accessing speed of said first storage medium is higher than accessing speed of said second storage medium.

* * * * *